(12) United States Patent
Takaki et al.

(10) Patent No.: US 11,378,019 B2
(45) Date of Patent: Jul. 5, 2022

(54) GAS TURBINE CONTROL APPARATUS AND GAS TURBINE CONTROL METHOD

(71) Applicant: Mitsubishi Hitachi Power Systems, Ltd., Kanagawa (JP)

(72) Inventors: Kazushige Takaki, Tokyo (JP); Akihiko Saito, Tokyo (JP); Ryuji Takenaka, Yokohama (JP); Koshiro Fukumoto, Yokohama (JP); Tomohide Akiyama, Yokohama (JP); Kazuhito Ohashi, Yokohama (JP); Yoshifumi Iwasaki, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 510 days.

(21) Appl. No.: 16/466,088

(22) PCT Filed: Dec. 15, 2017

(86) PCT No.: PCT/JP2017/045073
§ 371 (c)(1),
(2) Date: Jun. 3, 2019

(87) PCT Pub. No.: WO2018/110696
PCT Pub. Date: Jun. 21, 2018

(65) Prior Publication Data
US 2020/0063662 A1 Feb. 27, 2020

(30) Foreign Application Priority Data
Dec. 15, 2016 (JP) .............................. JP2016-243359

(51) Int. Cl.
*F02C 9/28* (2006.01)
(52) U.S. Cl.
CPC .......... *F02C 9/28* (2013.01); *F05D 2270/303* (2013.01)

(58) Field of Classification Search
CPC ...... F02C 9/26; F02C 9/00; F02C 9/28; F05D 2270/303
See application file for complete search history.

(56) References Cited

U.S. PATENT DOCUMENTS

| | | | | |
|---|---|---|---|---|
| 6,704,620 | B1 * | 3/2004 | Kutzner | F02C 9/48 60/793 |
| 10,161,317 | B2 * | 12/2018 | Sonoda | F02C 9/22 |
| 10,612,472 | B2 * | 4/2020 | Endo | F23R 3/346 |
| 10,634,058 | B2 * | 4/2020 | Iwasaki | F01D 9/041 |
| 10,669,959 | B2 * | 6/2020 | Sonoda | F02C 9/28 |

(Continued)

FOREIGN PATENT DOCUMENTS

| | | |
|---|---|---|
| CN | 101268266 | 9/2008 |
| CN | 103080504 | 5/2013 |

(Continued)

OTHER PUBLICATIONS

International Search Report dated Feb. 20, 2018 in International (PCT) Application No. PCT/JP2017/045073, with English translation.

(Continued)

*Primary Examiner* — Todd E Manahan
*Assistant Examiner* — Rodolphe Andre Chabreyrie
(74) *Attorney, Agent, or Firm* — Wenderoth, Lind & Ponack, L.L.P.

(57) ABSTRACT

A first fuel flow rate command value indicating a command value of a fuel input amount is calculated so that an output of a gas turbine matches a target output. An upper limit value of the first fuel flow rate command value is calculated based on a deviation obtained by subtracting, from an estimated value of a turbine inlet temperature of the gas turbine, a second limit value relating to the estimated value set such that the estimated value does not exceed a first limit value of the turbine inlet temperature.

8 Claims, 5 Drawing Sheets

(56) References Cited

U.S. PATENT DOCUMENTS

| | | | |
|---|---|---|---|
| 10,746,106 B2 * | 8/2020 | Yamamoto | F02C 7/24 |
| 11,048,245 B2 * | 6/2021 | Kishi | G06N 3/08 |
| 2002/0011063 A1 * | 1/2002 | Nagata | F02C 6/18 |
| | | | 60/773 |
| 2006/0005526 A1 * | 1/2006 | Tanaka | F02C 9/00 |
| | | | 60/39.27 |
| 2007/0051109 A1 | 3/2007 | Sonoda et al. | |
| 2013/0147208 A1 | 6/2013 | Kishi et al. | |
| 2017/0074175 A1 | 3/2017 | Uyama et al. | |
| 2017/0089268 A1 * | 3/2017 | Uyama | F02C 9/54 |
| 2017/0254282 A1 | 9/2017 | Sonoda et al. | |
| 2019/0383222 A1 * | 12/2019 | Takaki | F02C 9/28 |

FOREIGN PATENT DOCUMENTS

| | | | | |
|---|---|---|---|---|
| CN | 106103942 | | 11/2016 | |
| JP | 05141266 A | * | 6/1993 | |
| JP | 08-135406 | | 5/1996 | |
| JP | 2002-38972 | | 2/2002 | |
| JP | 2004-132255 | | 4/2004 | |
| JP | 2005-240608 | | 9/2005 | |
| JP | 2007-71144 | | 3/2007 | |
| JP | 2009-019528 | | 1/2009 | |
| JP | 2015183619 A | * | 10/2015 | F02C 9/18 |
| JP | 2016-61242 | | 4/2016 | |

OTHER PUBLICATIONS

Written Opinion of the International Searching Authority dated Feb. 20, 2018 in International (PCT) Application No. PCT/JP2017/045073, with English translation.

* cited by examiner

GAS TURBINE CONTROL APPARATUS AND
GAS TURBINE CONTROL METHOD

CROSS-REFERENCE TO RELATED
APPLICATION

Priority is claimed from Japanese Patent Application No. 2016-243359, filed Dec. 15, 2016, the content of which is incorporated herein by reference.

TECHNICAL FIELD

The present invention relates to a gas turbine control apparatus and a gas turbine control method.

BACKGROUND ART

Apparatuses for monitoring a gas turbine inlet temperature to control a gas turbine are disclosed in Japanese Unexamined Patent Application, First Publication No. 2007-71144 and Japanese Unexamined Patent Application, First Publication No. H08-135406. When the gas turbine inlet temperature exceeds a limit value, there is a risk of components such as the combustor and turbine constituting the gas turbine being damaged. Therefore, it is necessary to control the gas turbine inlet temperature so as not to exceed the limit value.

DISCLOSURE OF THE INVENTION

Problems to be Solved by the Invention

A generator at a power generation plant is driven by the gas turbine described above, with the generator being connected to a power system. An increase in the load of the power system sometimes causes the frequency in the power system to sharply drop. With such a sharp frequency decrease, there is a concern that the ratio of the fuel flow rate to the gas turbine output increases rapidly, leading to a rapid increase in the gas turbine inlet temperature.

This invention has as its object to provide a gas turbine control apparatus and a gas turbine control method that can solve the above-mentioned problem.

Means for Solving the Problems

According to a first aspect of the present invention, a gas turbine control apparatus includes: a first control signal output (CSO) calculation unit configured to calculate a first fuel flow rate command value indicating a command value CSO of a fuel input amount so that an output of a gas turbine matches a target output; and a second CSO calculation unit configured to calculate an upper limit value of the first fuel flow rate command value, and the second CSO calculation unit is configured to calculate the upper limit value of the first fuel flow rate command value based on a deviation obtained by subtracting a second limit value from an estimated value of a turbine inlet temperature of the gas turbine, the second limit value relating to the estimated value and being set such that the estimated value does not exceed the first limit value of the turbine inlet temperature.

In the gas turbine control apparatus, the second CSO calculation unit may be configured to calculate the upper limit value of the first fuel flow rate command value that suppresses an increase in the upper limit value of the first fuel flow rate command value when the deviation is equal to or greater than a predetermined deviation in which the estimated value of the turbine inlet temperature is determined to exceed the first limit value.

In the gas turbine control apparatus, the second CSO calculation unit may be configured to fix the upper limit value of the first fuel flow rate command value to a currently calculated upper limit value when the deviation is equal to or greater than the predetermined deviation.

In the gas turbine control apparatus, the second CSO calculation unit may be configured to fix the upper limit value of the first fuel flow rate command value to a predetermined upper limit value when the deviation is equal to or greater than the predetermined deviation.

In the gas turbine control apparatus, the second CSO calculation unit may be configured to fix the upper limit value of the first fuel flow rate command value to a value corresponding to the deviation when the deviation is equal to or greater than the predetermined deviation.

According to a second aspect of the present invention, a gas turbine control apparatus: a first control signal output (CSO) calculation unit configured to calculate a first fuel flow rate command value indicating a command value CSO of a fuel input amount so that an output of a gas turbine matches a target output; and a second CSO calculation unit configured to calculate a deviation by subtracting a second limit value from an estimated value of a turbine inlet temperature of the gas turbine, the second limit value relating to the estimated value and being set such that the estimated value does not exceed the first limit value of the turbine inlet temperature, the second CSO calculation unit being configured to calculate a second fuel flow rate command value by adding a predetermined value to a post-selection fuel flow rate command value that is currently selected among a plurality of fuel flow rate command values that include the first fuel flow rate command value when the deviation is not equal to or greater than a predetermined deviation in which the estimated value of the turbine inlet temperature is determined to exceed the first limit value, and the second CSO calculation unit being configured to calculate a second fuel command value that suppresses the post-selection fuel flow rate command value when the deviation is equal to or greater than the predetermined deviation.

According to a third aspect of the present invention, a gas turbine control method includes: calculating a first fuel flow rate command value indicating a command value control signal output (CSO) of a fuel input amount so that an output of a gas turbine matches a target output, by a first CSO calculation unit; and calculating an upper limit value of the first fuel flow rate command value, by a second CSO calculation unit, and the second CSO calculation unit calculates the upper limit value of the first fuel flow rate command value based on a deviation obtained by subtracting a second limit value from an estimated value of a turbine inlet temperature of the gas turbine, the second limit value relating to the estimated value and being set such that the estimated value does not exceed the first limit value of the turbine inlet temperature.

According to a fourth aspect of the present invention, a gas turbine control method includes: calculating a first fuel flow rate command value indicating a command value control signal output (CSO) of a fuel input amount so that an output of a gas turbine matches a target output, by a first CSO calculation unit; and calculating a deviation by subtracting a second limit value from an estimated value of a turbine inlet temperature of the gas turbine, by second CSO calculation unit, the second limit value relating to the estimated value and being set such that the estimated value does not exceed the first limit value of the turbine inlet temperature, calculating a second fuel flow rate command value by adding a predetermined value to a post-selection fuel flow rate command value that is currently selected among a plurality of fuel flow rate command values that include the first fuel flow rate command value when the deviation is not equal to or greater than a predetermined deviation in which the estimated value of the turbine inlet temperature is determined to exceed the first limit value, and calculating a second fuel command value that suppresses the post-selection fuel flow rate command value when the deviation is equal to or greater than the predetermined deviation.

Effects of the Invention

According to the present invention, it is possible to suppress a rapid increase in the ratio of the fuel flow rate to the gas turbine output when a rapid frequency drop occurs in the power system connected to a generator driven by a gas turbine. This can reduce the possibility of the turbine inlet temperature exceeding the limit value.

EMBODIMENTS FOR CARRYING OUT THE INVENTION

First Embodiment

Figure 1:
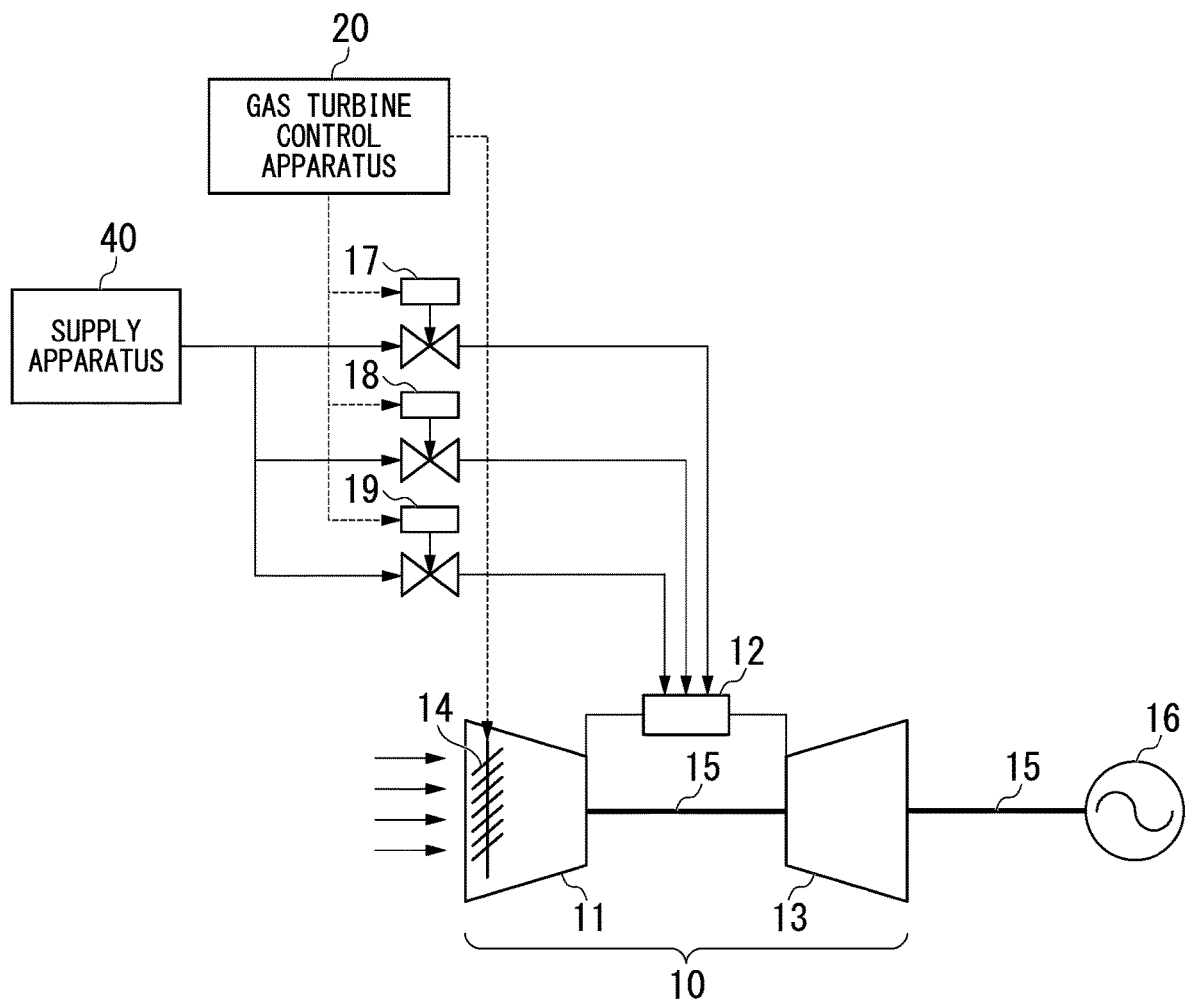
FIG. 1 is a system diagram of a gas turbine plant according to the present embodiment.

Hereinbelow, a gas turbine plant including a gas turbine control apparatus according to a first embodiment will be described referring to the drawings.

FIG. 1 is a system diagram of a gas turbine plant according to the present embodiment.

As shown in FIG. 1, the gas turbine plant of the present embodiment is provided with a gas turbine 10, a generator 16 generating electric power by the driving of the gas turbine 10, a gas turbine control apparatus 20 controlling the gas turbine 10, and a supply apparatus 40 that supplies fuel to the gas turbine 10. The gas turbine 10 and the generator 16 are connected by a rotor 15.

The gas turbine 10 is constituted by including a compressor 11 that compresses air to generate compressed air, a combustor 12 that mixes and combusts the compressed air and fuel gas to generate high-temperature combustion gas, a turbine 13 driven by the combustion gas, and the like. The turbine inlet temperature described below refers to the temperature of the inlet at which the high-temperature combustion gas discharged from the combustor 12 enters the turbine 13.

The compressor 11 is provided with an inlet guide vane (IGV) 14. The IGV 14 regulates the amount of air flowing into the compressor 11.

The combustor 12 is connected via fuel supply systems with a fuel supply apparatus 40 that supplies fuel such as fuel gas to the combustor 12. The combustor 12 is supplied with fuel from the plurality of fuel supply systems. Between the supply apparatus 40 and the combustor 12, control valves 17 to 19 for adjusting the fuel supply amount for each fuel supply system are provided.

Figure 2:
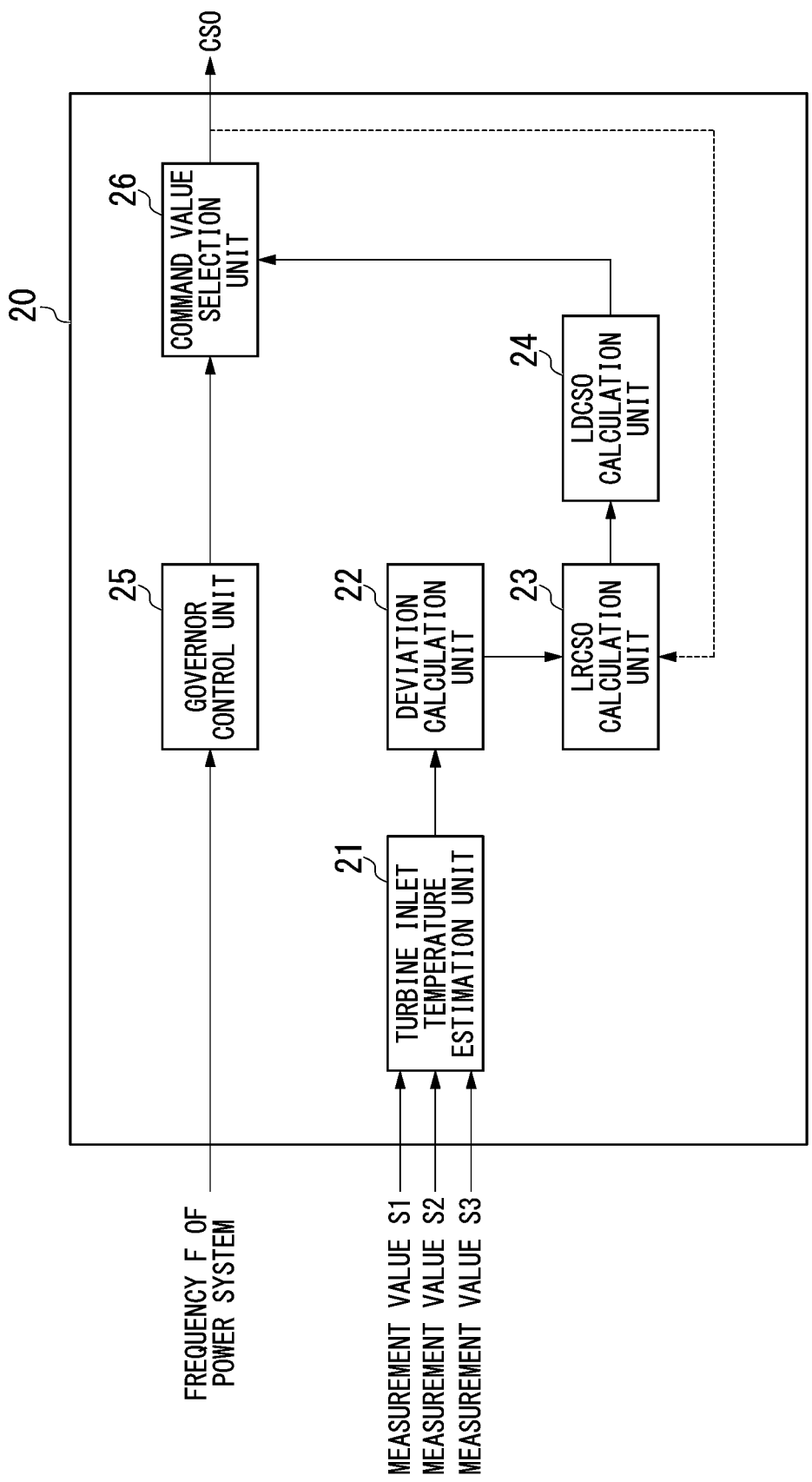
FIG. 2 is a function block diagram of the gas turbine control apparatus according to the first embodiment.

FIG. 2 is a function block diagram of the gas turbine control apparatus according to the present embodiment.

The gas turbine control apparatus 20 is a computer and may be constituted by a storage unit such as read only memory (ROM), random access memory (RAM), a hard disk drive (HDD) and the like, and hardware such as a CPU (central processing unit) and communication interfaces.

The CPU of the gas turbine control apparatus 20 executes a stored control program based on a user operation. Thereby, the gas turbine control apparatus 20 has the functions of a turbine inlet temperature estimation unit 21, a deviation calculation unit 22, a LRCSO calculation unit 23, a LDCSO calculation unit 24, a governor control unit 25, and a command value selection unit 26. Although the gas turbine control apparatus 20 actually has functions other than the function units illustrated in FIG. 2 by executing the control program, for convenience of description, only the function units illustrated in FIG. 2 will be described.

The turbine inlet temperature estimation unit 21 inputs parameters such as a plurality of measurement values S1, S2, and S3 and calculates an estimated value of the turbine inlet temperature using these parameters.

The deviation calculation unit 22 calculates a deviation from the estimated value of the turbine inlet temperature by subtracting from the estimated value of the turbine inlet temperature a second limit value relating to the estimated value that is set such that the estimated value does not exceed a first limit value of the turbine inlet temperature. The first limit value is a value indicating that damage may occur to the components that make up the turbine 13 if the turbine inlet temperature increases to or above this value. The second limit value is a value provided so that the turbine inlet temperature does not become equal to or greater than the first limit value, and is a limit value of the estimated value of the turbine inlet temperature.

The LRCSO calculation unit 23 (second CSO calculation unit) calculates the upper limit value of the first fuel flow rate command value calculated by the LDCSO calculation unit 24. The LRCSO calculation unit 23 calculates the upper limit value of the first fuel flow rate command value based on the deviation obtained by subtracting the second limit value from the estimated value of the turbine inlet temperature.

Specifically, the LRCSO calculation unit 23 calculates the upper limit value (LRCSO) of LDSCO (first fuel flow rate command value) for suppressing a rise of the upper limit value (LRCSO) of LDCSO when the deviation calculated by the deviation calculation unit 22 is equal to or greater than a predetermined deviation in which it is judged that the estimated value of the turbine inlet temperature may exceed the first limit value.

For example, when the deviation calculated by the deviation calculation unit 22 is equal to or greater than a predetermined deviation, the LRCSO calculation unit 23 fixes the upper limit value (LRCSO) of the LDCSO to the currently calculated upper limit value. The upper limit value (LRCSO) calculated by the LRCSO calculation unit 23 is a value that moves up and down depending on each parameter relating to the gas turbine 10 that is input, and fixes that value.

When the deviation calculated by the deviation calculation unit 22 is equal to or greater than the predetermined deviation, the LRCSO calculation unit 23 may fix the upper limit value of the first fuel flow rate command value to a predetermined upper limit value. The predetermined upper limit value is a value of the fuel flow rate command value for ensuring that the actual turbine inlet temperature does not exceed the first limit value.

When the deviation calculated by the deviation calculation unit 22 is equal to or greater than a predetermined deviation, the LRCSO calculation unit 23 may fix the upper limit value of the first fuel flow rate command value to a value corresponding to the deviation. The value corresponding to the deviation is also a value of the fuel flow rate command value for preventing the actual turbine inlet temperature from exceeding the first limit value.

The LDCSO calculation unit 24 (first CSO calculation unit) calculates the LDCSO (first fuel flow rate command value) indicating a CSO (Control Signal Output) for controlling the fuel input amount so that the output of the gas turbine 10 matches the target output. The LDCSO calculation unit 24 calculates a CSO that does not exceed the value of the LRCSO, which is the upper limit value of the LDCSO calculated by the LRCSO calculation unit 23.

The governor control unit 25 (third CSO calculation unit) inputs a frequency F of the power system to which the generator 16 is connected. The governor control unit 25 calculates, based on the frequency F, a fuel flow rate command value (CSO) that increases the output when the frequency decreases. The fuel flow rate command value calculated by the governor control unit 21 is referred to as GVCSO.

The command value selection unit 26 compares GVCSO acquired from the governor control unit 25 with LDCSO acquired from the LDCSO calculation unit 24 and outputs the smaller value as a CSO. The CSO is output to the control valves 17 to 19 to control the fuel flow rate.

Figure 3:
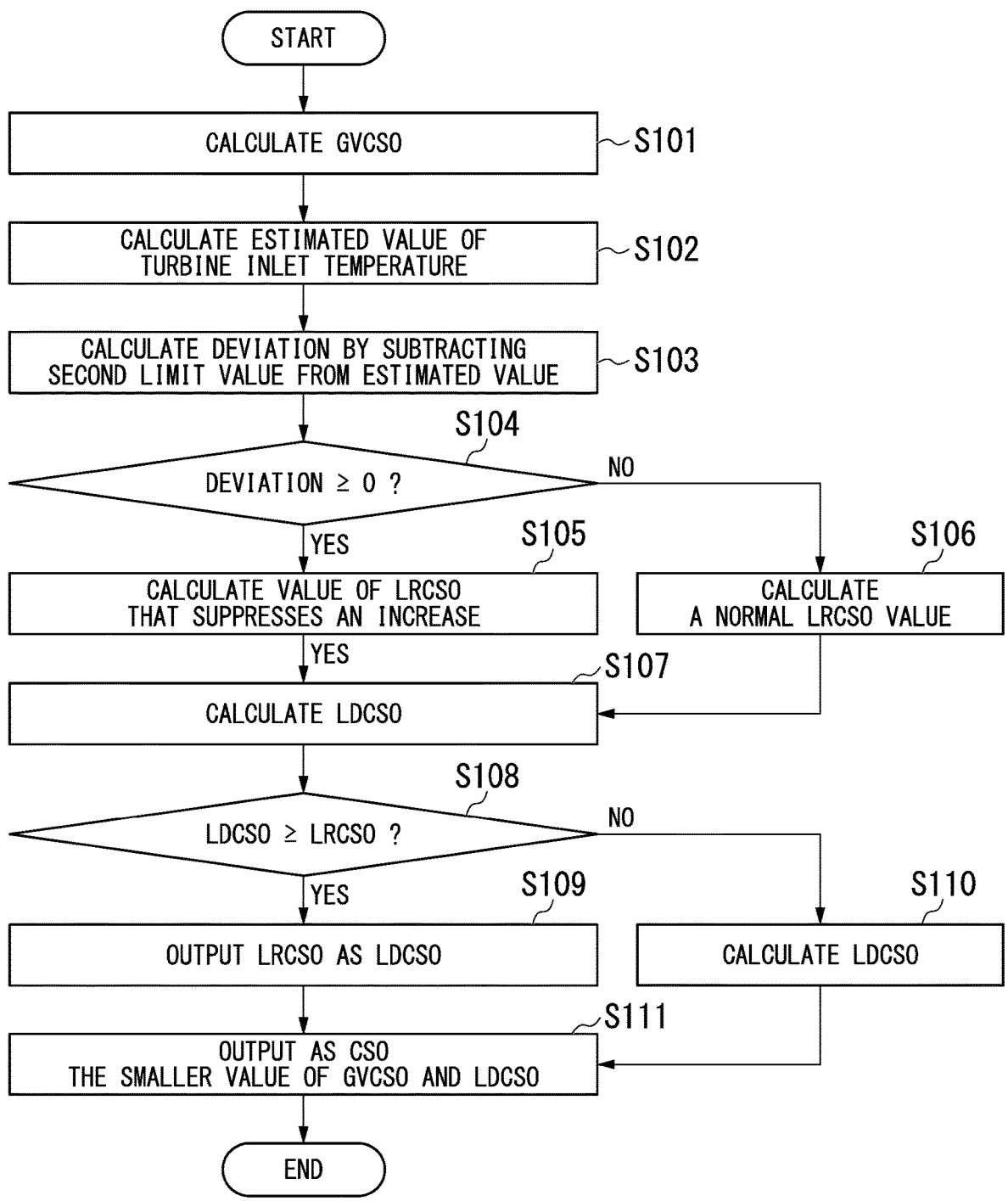
FIG. 3 is a diagram showing a process flow of the gas turbine control apparatus according to the first embodiment.

FIG. 3 is a diagram showing a process flow of the gas turbine control apparatus according to the first embodiment.

Next, processing of the gas turbine control system according to the first embodiment will be described.

The governor control unit 25 acquires information of the frequency F of the power system. The governor control unit 25 inputs the value of the frequency F into a GVCSO calculation formula to calculate GVCSO (Step S101). The governor control unit 25 outputs the calculated GVCSO to the command value selection unit 26. The GVCSO calculation formula is a formula for calculating a fuel flow rate command value (CSO) that increases the output at the time of frequency decrease based on the frequency F.

The turbine inlet temperature estimation unit 21 acquires various parameters. The turbine inlet temperature estimation unit 21 inputs the various parameters into a formula for calculating an estimated value of the turbine inlet temperature to calculate an estimated value (Step S102). The turbine inlet temperature estimation unit 21 outputs the estimated value to the deviation calculation unit 22. The deviation calculation unit 22 subtracts the second limit value from the estimated value to calculate a deviation (Step S103). The deviation calculation unit 22 outputs the deviation obtained by subtracting the second limit value from the estimated value to the LRCSO calculation unit 23.

The LRCSO calculation unit 23 determines whether the acquired deviation is equal to or greater than 0 (Step S104). When the deviation is equal to or greater than 0, the LRCSO calculation unit 23 performs control to suppress an increase in the value of LRCSO (Step S105). When the deviation is less than 0, the LRCSO calculation unit 23 calculates a normal LRCSO value (Step S106). The calculation of the normal LRCSO value is a value obtained by adding a predetermined bias value or the like to the CSO selected and output by the command value selection unit 26. For example, normally, LRCSO can be calculated by the formula LRCSO=CSO+x %. When the deviation is equal to or greater than 0, the LRCSO calculation unit 23 fixes the upper limit value of LDCSO to the currently calculated LRCSO.

When the deviation calculated by the deviation calculation unit 22 is equal to or greater than 0, the LRCSO calculation unit 23 may fix LRCSO to a predetermined value. When the deviation calculated by the deviation calculation unit 22 is equal to or greater than 0, the LRCSO calculation unit 23 may fix LRCSO to a value corresponding to the deviation.

The LDCSO calculation unit 24 inputs parameters and calculates LDCSO (Step S107). The parameters to be input include a load limit set value and the generator output. The LDCSO calculation unit 24 compares the load limit set value (the upper limit value or target value set for the load of the generator output) with the generator output, and performs a feedback operation that calculates LDCSO to make the values coincide. Further, the LDCSO calculation unit 24 acquires LRCSO. The LDCSO calculation unit 24 determines whether the calculated LDCSO is equal to or greater than LRCSO (Step S108). If the calculated LDCSO is equal to or greater than LRCSO, the LDCSO calculation unit 24 outputs LRCSO as LDCSO to the command value selection unit 26 (Step S109). When the calculated LDCSO is less than LRCSO, the LDCSO calculation unit 24 outputs the calculated LDCSO to the command value selection unit 26 (Step S110).

The command value selection unit 26 compares GVCSO acquired from the governor control unit 25 with LDCSO acquired from the LDCSO calculation unit 24. The command value selection unit 26 outputs the smaller value of GVCSO and LDCSO as a CSO (Step S111). The CSO is output to the control valves 17 to 19 to control the fuel flow rate.

According to the processing of the first embodiment described above, the gas turbine control apparatus 20 can determine whether to suppress the value of LRCSO using the estimated value of the turbine inlet temperature obtained by the estimation operation. Therefore, even if a rapid frequency drop occurs in the power system connected to the generator 16 and thereby the ratio of the fuel flow rate to the gas turbine output rapidly increases, a rise of LRCSO, which is the upper limit value of the LDCSO, is suppressed. As a result, the value of the CSO which the command value selection unit 26 selects and outputs can also be suppressed.

Second Embodiment

Next, a gas turbine control apparatus according to a second embodiment will be described.

A gas turbine plant including a gas turbine control apparatus 30 according to the second embodiment is the same as that in FIG. 1.

Figure 4:
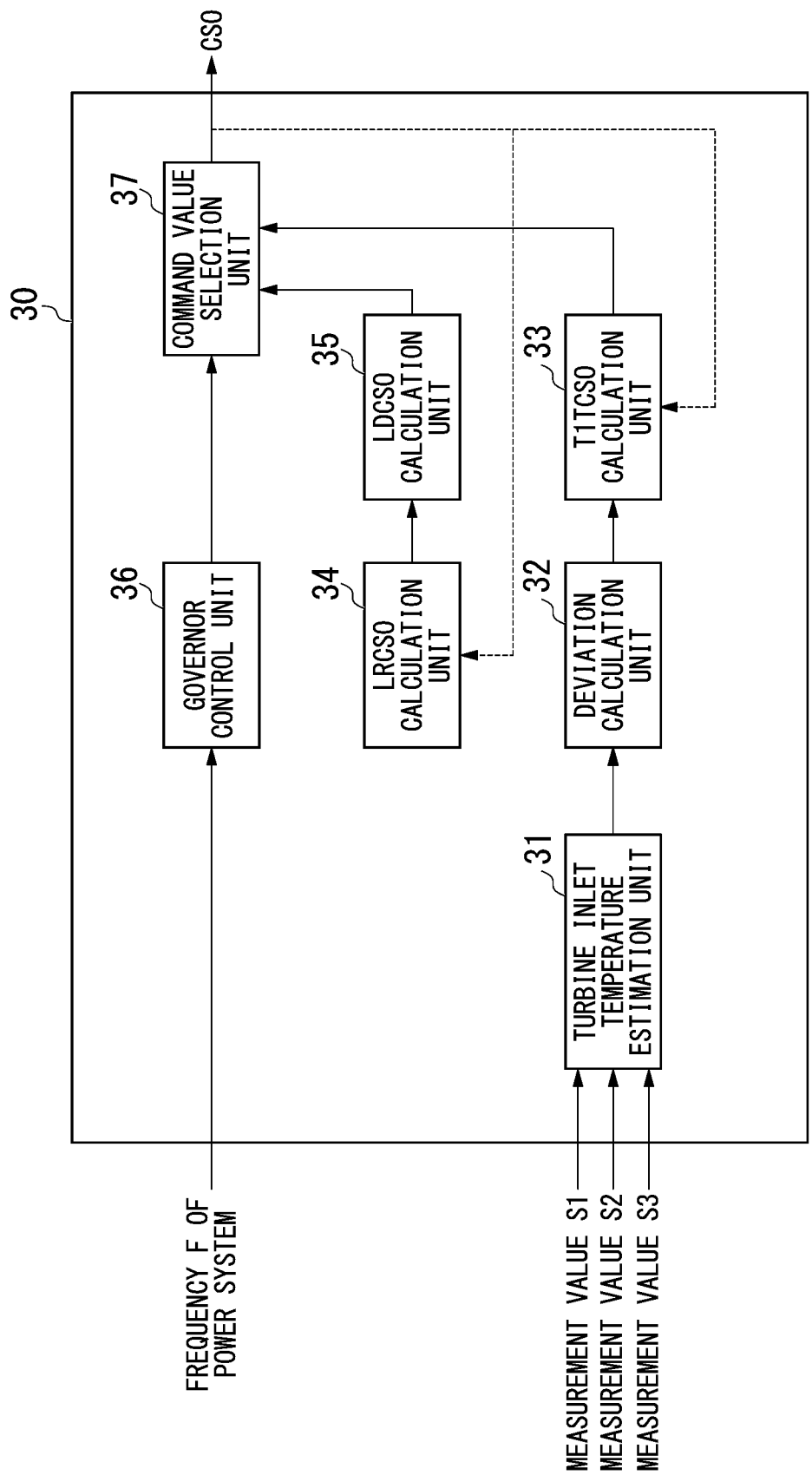
FIG. 4 is a function block diagram of the gas turbine control apparatus according to the second embodiment.

FIG. 4 is a function block diagram of the gas turbine control apparatus according to the second embodiment.

The gas turbine control apparatus 30 is also a computer and may be constituted by a storage unit such as read only memory (ROM), random access memory (RAM), a hard disk drive (HDD) and the like, and hardware such as a CPU (central processing unit) and communication interfaces.

The CPU of the gas turbine control apparatus 30 executes a stored control program based on a user operation. Thereby, the gas turbine control apparatus 30 has the functions of a turbine inlet temperature estimation unit 31, a deviation calculation unit 32, a T1TCSO calculation unit 33, a LRCSO calculation unit 34, a LDCSO calculation unit 35, a governor control unit 36, and a command value selection unit 37. Although the gas turbine control apparatus 30 actually has functions other than the function units illustrated in FIG. 4 by executing the control program, for convenience of description, only the function units illustrated in FIG. 4 will be described.

The turbine inlet temperature estimation unit 31 inputs parameters such as a plurality of measurement values S1, S2, and S3 and calculates an estimated value of the turbine inlet temperature using these parameters. The turbine inlet temperature may be estimated using a publicly known formula.

The deviation calculation unit 32 calculates a deviation by subtracting from the estimated value of the turbine inlet temperature a second limit value relating to the estimated value that is set such that the estimated value does not exceed a first limit value of the turbine inlet temperature. The first limit value is a value indicating that damage may occur to the components that make up the gas turbine 10 if the turbine inlet temperature increases to or above this value. The second limit value is a value provided so that the turbine inlet temperature does not become equal to or exceed the first limit value, and is a limit value of the estimated value of the turbine inlet temperature.

When the deviation is not equal to or greater than a predetermined deviation, the T1TCSO calculation unit 33 (second CSO calculation unit in the second embodiment) calculates T1TCSO (a second fuel flow rate command value) by adding a predetermined value to a post-selection fuel flow rate command value that has been selected and output by the command value selection unit 37. The T1TCSO calculation unit 33 calculates T1TCSO (second fuel command value) that suppresses the post-selection fuel flow rate command value CSO when the deviation is equal to or greater than a predetermined deviation.

The LRCSO calculation unit 34 calculates the upper limit value of LDCSO (first fuel flow rate command value) calculated by the LDCSO calculation unit 35.

The LDCSO calculation unit 35 (first CSO calculation unit in the second embodiment) calculates LDCSO (first fuel flow rate command value) indicating a CSO (control signal output) for controlling a fuel input amount so that the output of the gas turbine 10 matches a target output. The LDCSO calculation unit 35 calculates a CSO that does not exceed the value of LRCSO, which is the upper limit value of LDCSO calculated by the LRCSO calculation unit 34.

The governor control unit 36 (third CSO calculation unit) inputs a frequency F of the power system to which the generator 16 is connected. The governor control unit 36 calculates, based on the frequency F, a fuel flow rate command value (CSO) that increases the output when the frequency decreases. The fuel flow rate command value calculated by the governor control unit 36 is referred to as GVSCO.

The command value selection unit 37 compares GVCSO acquired from the governor control unit 36, LDCSO acquired from the LDCSO calculation unit 35, and T1TCSO acquired from the T1TCSO calculation unit 33, and outputs the smallest value as a CSO. The CSO is output to the control valves 17 to 19 to control the fuel flow rate.

Figure 5:
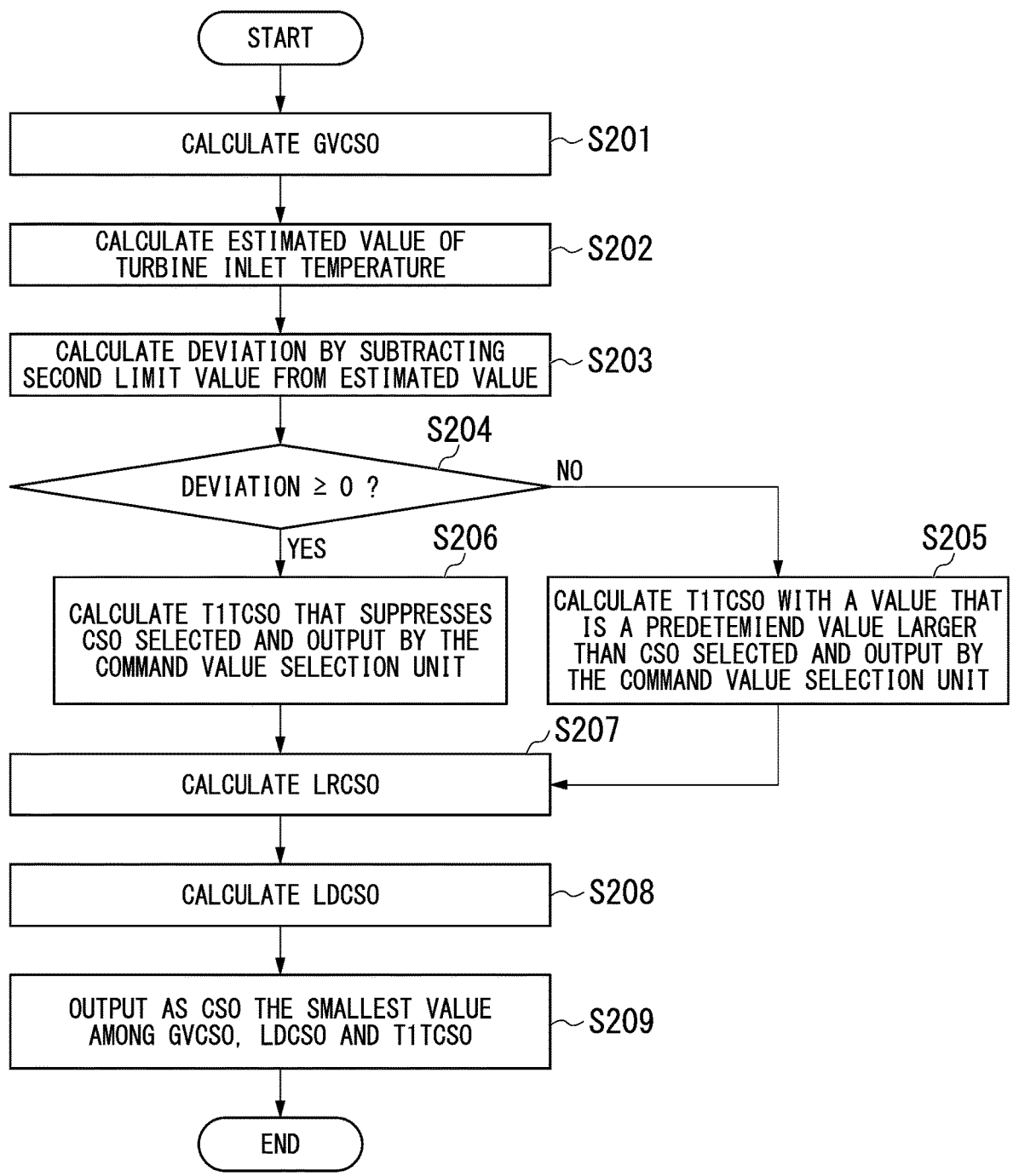
FIG. 5 is a diagram showing a process flow of the gas turbine control apparatus according to the second embodiment.

FIG. 5 is a diagram showing a process flow of the gas turbine control apparatus according to the second embodiment.

Next, processing of the gas turbine control apparatus 30 according to the second embodiment will be described.

The governor control unit 36 acquires information of the frequency F of the power system. The governor control unit 36 inputs the value of the frequency F into a GVCSO calculation formula to calculate GVCSO (Step S201). The governor control unit 36 outputs the calculated GVCSO to the command value selection unit 37. The GVCSO calculation formula is a formula for calculating a fuel flow rate command value (CSO) that increases the output at the time of frequency decrease based on the frequency F.

The turbine inlet temperature estimation unit 31 acquires various parameters. The turbine inlet temperature estimation unit 31 inputs the various parameters into a formula for calculating an estimated value of the turbine inlet temperature T1T to calculate an estimated value (Step S202). The turbine inlet temperature estimation unit 31 outputs the estimated value to the deviation calculation unit 32. The deviation calculation unit 32 subtracts the second limit value from the estimated value to calculate a deviation (Step S203). That is, the deviation calculated by the deviation calculation unit 32 is a value obtained by subtracting from the estimated value of the turbine inlet temperature T1T the second limit value relating to an estimated value set such that the estimated value does not exceed the first limit value of the turbine inlet temperature. The deviation calculation unit 32 outputs the calculated deviation to the T1TCSO calculation unit 33. In the calculation of Step S202, the estimated value may be calculated using a publicly known calculation formula.

The T1TCSO calculation unit 33 determines whether the acquired deviation is equal to or greater than 0 (Step S204). Under normal conditions where the obtained deviation is less than 0, the T1TCSO calculation unit 33 acquires various parameters for the T1TCSO calculation formula and the CSO selected and output by the command value selection unit 37, and calculates T1TCSO having a value larger than the CSO (Step S205). When the acquired deviation is equal to or greater than 0, the T1TCSO calculation unit 33 calculates T1TCSO that suppresses the CSO selected and output by the command value selection unit 37 (Step S206). The T1TCSO calculation unit 33 outputs the calculated T1TCSO to the command value selection unit 37. In the process of Step S206, the T1TCSO calculation unit 33 for example calculates and outputs as T1TCSO a value obtained by multiplying the CSO by a rate limiter (a limit on the rate of change of the CSO, particularly the rate of increase) from the moment when the deviation exceeds 0. More specifically, in order that the increase change rate of the CSO becomes 0 as one example, the T1TCSO calculation unit 33 makes the value of the CSO that was input last a fixed value, and by outputting that value, sets the value of T1TCSO so as not to increase further.

The LRCSO calculation unit 34 calculates an upper limit value (LRCSO) of LDCSO indicating a value obtained by adding a predetermined bias value or the like to the CSO selected and output by the command value selection unit 37 (Step S207). The LRCSO calculation unit 34 outputs the calculated upper limit value (LRCSO) of LDCSO to the LDCSO calculation unit 35.

The LDCSO calculator 35 inputs each parameter to calculate LDCSO (Step S208). A specific example of calculation of LDCSO is the same as that of the first embodiment. The LDCSO calculation unit 35 also acquires LRCSO. The LDCSO calculator 35 determines whether the calculated LDCSO is equal to or greater than LRCSO. When the calculated LDCSO is less than LRCSO, the LDCSO calculation unit 35 outputs the calculated LDCSO to the command value selection unit 37. When the calculated LDCSO is equal to or greater than LRCSO, the LDCSO calculation unit 35 outputs LRCSO as LDCSO to the command value selection unit 37.

The command value selection unit 37 compares GVCSO acquired from the governor control unit 36, LDCSO acquired from the LDCSO calculation unit 35, and T1TCSO acquired from the T1TCSO calculation unit 33. The command value selection unit 37 outputs the smallest value among GVCSO, LDCSO, and T1TCSO as a CSO (Step S209). The CSO is output to the control valves 17 to 19 to control the fuel flow rate.

According to the process of the second embodiment described above, when the deviation of the estimated turbine inlet temperature T1T from the second limit value exceeds a predetermined value, the gas turbine control apparatus 30 calculates a value of T1TCSO for suppressing a rise of CSO selected by the command value selection unit 37 and outputs the value to the command value selection unit 37. Therefore, even if a rapid frequency drop occurs in the power system to which the generator 16 is connected, whereby the ratio of the fuel flow rate to the gas turbine output rapidly increases, it is possible so suppress a rise of the CSO selected by the command value selection unit 37 with the calculated T1TCSO.

The aforementioned gas turbine control apparatus may contain a computer system inside. A program for causing the gas turbine control apparatus to perform the above-described processes is stored in a computer-readable recording medium of the gas turbine control apparatus, and the computer of the apparatus reads and executes the program, whereby the aforementioned processes are performed. Here, the computer readable recording medium refers to a magnetic disk, a magneto-optical disk, a CD-ROM, a DVD-ROM, a semiconductor memory, and the like. Alternatively, the computer program may be distributed to computers through a communication line, and the computers, upon receiving the distribution, may execute the program.

Additionally, the abovementioned program may be a program for achieving a portion of the function of each process described above. Furthermore, the abovementioned program may be a so-called differential file (differential program) capable of implementing the functions described above in combination with a program that is already recorded in the computer system.

INDUSTRIAL APPLICABILITY

The present invention relates to a gas turbine control apparatus and a gas turbine control method.

DESCRIPTION OF THE REFERENCE SYMBOLS

20, 30: Gas turbine control apparatus
21, 31: Turbine inlet temperature estimation unit
22, 32: Deviation calculation unit
23, 34: LRCSO calculation unit
24, 35: LDCSO calculation unit
25, 36: Governor control unit
26, 37: Command value selection unit
33: T1TCSO calculation unit
40: Supply apparatus

The invention claimed is:

1. A gas turbine control apparatus comprising:
a governor control unit configured to calculate a governor fuel flow rate command value based on a frequency of a power system connected to a generator, the governor fuel flow rate command value indicating a first command value control signal output (CSO) of a fuel input amount that increases an output of the generator when the frequency decreases, the generator being configured to generate electric power by driving of a gas turbine;
a first CSO calculation unit configured to calculate a first fuel flow rate command value indicating a second command value CSO of the fuel input amount so that an output of the gas turbine matches a target output;
a second CSO calculation unit configured to calculate an upper limit value of the first fuel flow rate command value based on a deviation obtained by subtracting a second limit value from an estimated value of a turbine inlet temperature of the gas turbine, the second limit value relating to the estimated value and being set such that the estimated value does not exceed a first limit value of the turbine inlet temperature,
wherein:
the first CSO calculation unit is configured to compare the first fuel flow rate command value with the upper limit value to output a smaller value of those values as the first fuel flow rate command value; and
a command value selection unit configured to output, to a control valve for adjusting the fuel input amount, a smaller value of the governor fuel flow rate command value and the first fuel flow rate command value that is output by the first CSO calculation unit.

2. The gas turbine control apparatus according to claim 1, wherein the second CSO calculation unit is configured to calculate an upper limit value that suppresses an increase in the upper limit value of the first fuel flow rate command value when the deviation is equal to or greater than a predetermined deviation in which the estimated value of the turbine inlet temperature is determined to exceed the first limit value.

3. The gas turbine control apparatus according to claim 2, wherein the second CSO calculation unit is configured to fix the upper limit value of the first fuel flow rate command value to a currently calculated upper limit value when the deviation is equal to or greater than the predetermined deviation.

4. The gas turbine control apparatus according to claim 2, wherein the second CSO calculation unit is configured to fix the upper limit value of the first fuel flow rate command value to a predetermined upper limit value when the deviation is equal to or greater than the predetermined deviation.

5. The gas turbine control apparatus according to claim 2, wherein the second CSO calculation unit is configured to fix the upper limit value of the first fuel flow rate command value to a value corresponding to the deviation when the deviation is equal to or greater than the predetermined deviation.

6. The gas turbine control apparatus according to claim 1, wherein the second CSO calculation unit is configured to calculate: (i) a second fuel flow rate command value by adding a predetermined value to a post-selection fuel flow rate command value that is currently selected among a plurality of fuel flow rate command values including the first fuel flow rate command value when the deviation is not equal to or greater than a predetermined deviation in which the estimated value of the turbine inlet temperature is determined to exceed the first limit value; and (ii) a third fuel flow rate command value that suppresses the post-selection fuel flow rate command value when the deviation is equal to or greater than the predetermined deviation.

7. A gas turbine control method comprising:
calculating, by a governor control unit, a governor fuel flow rate command value based on a frequency of a power system connected to a generator, the governor fuel flow rate command value indicating a first command value control signal output (CSO) of a fuel input amount that increases an output of the generator when the frequency decreases, the generator generating electric power by driving of a gas turbine;
calculating, by a first CSO calculation unit, a first fuel flow rate command value indicating a second command value CSO of the fuel input amount so that an output of the gas turbine matches a target output;
calculating, by a second CSO calculation unit, an upper limit value of the first fuel flow rate command value; and
outputting, by a command value selection unit to a control valve for adjusting the fuel input amount, a smaller value of the governor fuel flow rate command value and the first fuel flow rate command value that is output by the first CSO calculation unit,
wherein:
the second CSO calculation unit calculates the upper limit value of the first fuel flow rate command value based on a deviation obtained by subtracting a second limit value from an estimated value of a turbine inlet temperature of the gas turbine, the second limit value relating to the estimated value and being set such that the estimated value does not exceed a first limit value of the turbine inlet temperature; and
the first CSO calculation unit compares the first fuel flow rate command value with the upper limit value to output a smaller value of those values as the first fuel flow rate command value.

8. A gas turbine control method comprising:
calculating, by a governor control unit, a governor fuel flow rate command value based on a frequency of a power system connected to a generator, the governor fuel flow rate command value indicating a first command value control signal output (CSO) of a fuel input amount that increases an output of the generator when the frequency decreases, the generator generating electric power by driving of a gas turbine;
calculating, by a first CSO calculation unit, a first fuel flow rate command value indicating a second command value CSO of the fuel input amount so that an output of the gas turbine matches a target output;
calculating an upper limit value of the first fuel flow rate command value;
calculating, by a second CSO calculation unit, a deviation by subtracting a second limit value from an estimated value of a turbine inlet temperature of the gas turbine, the second limit value relating to the estimated value and being set such that the estimated value does not exceed a first limit value of the turbine inlet temperature, calculating a second fuel flow rate command value by adding a predetermined value to a post-selection fuel flow rate command value that is currently selected among a plurality of fuel flow rate command values including the first fuel flow rate command value when the deviation is not equal to or greater than a predetermined deviation in which the estimated value of the turbine inlet temperature is determined to exceed the first limit value, and calculating a third fuel flow rate command value that suppresses the post-selection fuel flow rate command value when the deviation is equal to or greater than the predetermined deviation; and
outputting, by a command value selection unit to a control valve for adjusting the fuel input amount, a smaller value of the governor fuel flow rate command value and the first fuel flow rate command value that is output by the first CSO calculation unit,
wherein the first CSO calculation unit compares the first fuel flow rate command value with the upper limit value to output a smaller value of those values as the first fuel flow rate command value.

* * * * *